United States Patent [19]

Hansen et al.

[11] Patent Number: 4,690,531

[45] Date of Patent: Sep. 1, 1987

[54] LOW COST TELEPHOTO AND NORMAL LENS CAMERA WITH AN EXTENDABLE FLASH

[75] Inventors: David E. Hansen, Fairport; Richard R. Kelbe, Fishers; Dana W. Wolcott, Honeoye, all of N.Y.

[73] Assignee: Eastman Kodak Company, Rochester, N.Y.

[21] Appl. No.: 748,535

[22] Filed: Jun. 24, 1985

[51] Int. Cl.⁴ .................. G03B 15/03; G03B 13/02
[52] U.S. Cl. .................. 354/149.11; 354/149.1; 354/195.12; 354/199; 354/222
[58] Field of Search .................. 354/126, 145.1, 149.1, 354/149.11, 195.1, 195.12, 199, 222; 362/18

[56] References Cited

U.S. PATENT DOCUMENTS

| | | | |
|---|---|---|---|
| 3,589,031 | 6/1971 | Whittaker | 34/122 |
| 3,598,031 | 8/1971 | Harvey | 354/195.1 |
| 3,783,261 | 1/1974 | Hartmann | 362/18 |
| 4,119,983 | 10/1978 | Tanaka | 354/195.12 |
| 4,122,466 | 10/1978 | Iwata | 354/413 |
| 4,141,059 | 2/1979 | Shiojiri | 362/18 |
| 4,171,887 | 10/1979 | Hayata | 354/149.1 |
| 4,176,930 | 12/1979 | Imura | 354/149.1 |
| 4,309,096 | 1/1982 | Sethi | 354/121 |
| 4,336,985 | 6/1982 | Iwata et al. | 354/145.1 |
| 4,352,546 | 10/1982 | Iwata et al. | 354/126 |
| 4,500,184 | 2/1985 | Morizumi et al. | 354/149.11 |
| 4,515,453 | 5/1985 | Wakabayashi et al. | 354/149.11 |
| 4,609,269 | 9/1986 | Kamata | 354/149.11 |

*Primary Examiner*—A. A. Mathews
*Attorney, Agent, or Firm*—Robert L. Randall

[57] ABSTRACT

A still camera comprised of a dual, normal and telephoto, lens with flash, incorporates features which allow controlling several camera functions with a single sliding multi-position flash housing. Position "normal" configures the camera so that the viewfinder has a normal field of view, the flash is unextended, and an objective lens of normal focal length is in exposure position. Position "tele" configures the camera so that the viewfinder has a narrow field of view, a telephoto lens is in exposure position, and the flash is fully extended. Additional positions of the flash housing and lens and viewfinder are also disclosed.

3 Claims, 8 Drawing Figures

LOW COST TELEPHOTO AND NORMAL LENS CAMERA WITH AN EXTENDABLE FLASH

BACKGROUND OF THE INVENTION

1. Field of the Invention

The present invention relates to a simple, inexpensive camera incorporating both a normal and a telephoto objective lens, a flash means, and a viewfinder having differeing fields of view appropriate to the focal length of the objective lens. The flash housing is movable and interconnects with both the viewfinder and the objective lens whereby the positions of both the viewfinder and the objective lens are controlled by the position of the flash housing. The camera user simply and easily moves the flash housing from a first position to a second position to effect either a normal taking condition or a telephoto taking condition. At the same time, the flash housing is appropriately moved to minimize the effect commonly known as "red eye".

2. Description of the Prior Art

Many camera are known in the prior art with a source of flash illumination incorporated therein. Many of those cameras utilizing either flash bulbs or electronic flash means, have been marketed with a flash which may be deployed from a stored position to an operating position more remote from the objective lens. In some cameras the movable flash is interconnected with the objective lens so that either the focal length of the lens or the aperture of the lens is affected by the deployment of the flash. Examples of these cameras are illustrated in U.S. Pat. Nos. 3,598,031 and 4,515,453. Still other camera are known in which the focal length of the objective lens is manually adjustable with means interconnecting the lens with elements associated with the flash source to selectively affect the light emanating from the flash source. Examples of these cameras are illustrated in U.S. Pat. No. 4,122,466 in which the angle at which the flash source projects the illumination is varied with changes in the focal length of the lens. In U.S. Pat. No. 4,176,930 a light diffusing plate is adjusted into and out of the path of the flash illumination in accordance with the focal length setting of the objective lens.

Further, other cameras have been developed which interconnect the objective lens, the viewfinder and the flash. For example, U.S. Pat. No. 4,171,887 discloses a camera in which the viewfinder and objective lens are interconnected with the source of flash illuminationn whereby a Fresnel lens is movably associated with the flash source to change the angle of flash illumination emanating therefrom in accordance with the focal length setting of the objective lens.

While these and various other combinationa of camera apparatus have been known, no cameras are known wherein the viewfinder, objective lens, and flash are all interconnected and where the objective lens-to-flash distance is varied according to the focal length of the lens being employed, thereby minimizing the problems of red eye.

Still further, no camera is known wherein the focal length of the objective lens and the viewing angle of the viewfinder are simply and effectively controlled by the camera user simply by deploying or retracting the flash housing in a simple, manual manner.

SUMMARY OF THE INVENTION

Accordingly, the present invention provides a simple, inexpensive still camera having a dual normal and telephoto, lens apparatus with a flash source and a viewfinder which caries its field of view in accordance with the focal length of the objective lens. This camera is of simple, compact and inexpensive construction and provides simple, manual selection of a normal field of view taking condition or a telephoto field of view taking condition, in which both the objective lens and the viewfinder are selectively positioned merely by deploying or retracting the movable flash housing.

In accordance with one aspect of the present invention a camera is provided which includes means for providing a source of flash illumination and means adjustable for varying the illumination projected towards a photographic subject. A viewfinder is adjustable to provide relatively wide angle and relatively narrow angle views of a scene. Lens apparatus is provided which is movable for focussing the camera according to the distance between the camera and the subject to be photographed. The improvment comprises control means for controlling jointly the lens apparatus, the flash source, and the viewfinder. The control means has a first condition in which the lens apparatus is focused at a relatively short distance, the flash source is positioned at a first distance from the lens apparatus, and the viewfinder is adjusted to provide a relatively wide angle view of a photographic scene including a photographic subject situated at a relatively short distance. The control means has a second condition in which the lens apparatus is focused at a relatively remote distance, the flash source is positioned at a second distance from the lens apparatus greater than the first distance, and the viewfinder is adjusted to provide a relatively narrow angel view of a photographic scene including a subject situated at the remote distance.

Further, the present invention provides a camera in which the flash source includes a flash housing which is selectively positionable in a first position proximate to the lens apparatus and a second position distant from the lens apparatus. The flash housing has first means for engaging a viewfinder turret and a second means for engaging a lens turret whereby the turrets are disposed with wide angle lens sets operatively positioned when the flash housing is disposed in its first position and the turrets are disposed with narrow angle lens sets operatively positioned when the flash housing is disposed in its second position.

Still further, both the viewfinder turret and the lens turret are provided with overcenter springs arranged to hold one or the other of the lenses in said turrets in operative position.

Various means for practicing the invention and other features and advantages thereof will be apparent from the following detailed description of illustrative preferred embodiments of the invention, reference being made to the accompanying drawings.

IN THE DRAWINGS

DESCRIPTION OF THE ILLUSTRATIVE PREFERRED EMBODIMENTS

Although the present invention is applicable to various kinds of cameras, the illustrative embodiments are directed to cameras adapted to use disk film cartridges of the type disclosed in U.S. Pat. No. 4,309,096, entitled FILM CARTRIDGE ASSEMBLY WITH PRESSURE PLATE, which was issued in the name of G. S. Sethi.

GENERAL DESCRIPTION OF CARTRIDGE AND CAMERA

Figure 1:
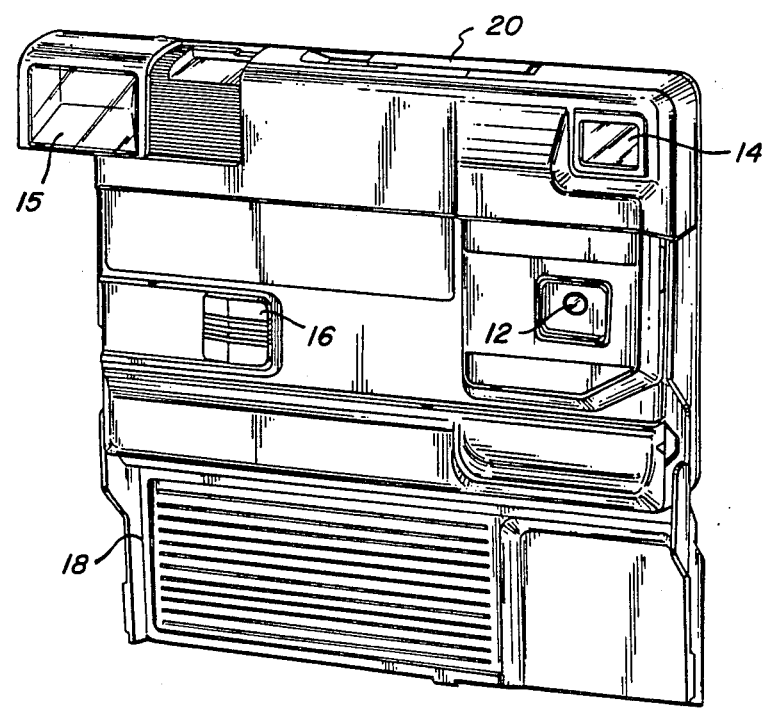
FIG. 1 is a front perspective view of a camera incorporating the invention depicting the camera in its telephoto operating position, with the flash extended.
Figure 2:
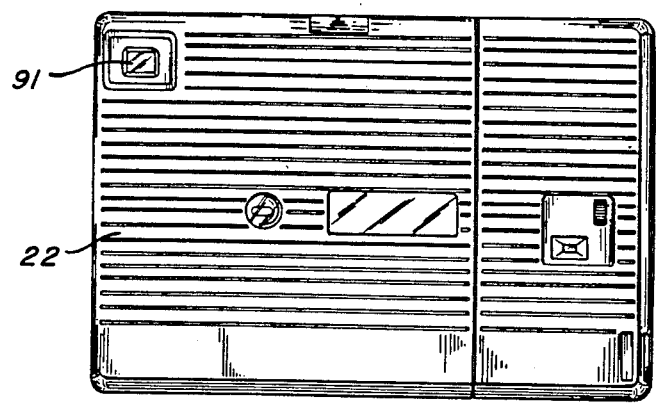
FIG. 2 is a rear view of the camera shown in FIG. 1.

Referring now to the drawings, and in particular to FIGS. 1 and 2, there is shown front and rear views of a camera 10 incorporating the present invention. The camera comprises a body in the form of a relatively thin, generally rectangular box. The camera front, shown in FIG. 1, includes a picture-taking lens 12, a viewfinder 14, a flash 15, and a shutter release button 16. Additionally, the camera can be provided with a movable cover-handle 18, as is well known in the art. A door release level 20, disposed in the top edge of the camera, is operable to unlatch a rear door 22, the camera, so it may be open for loading a film cartridge assembly. According to the teachings of the foregoing Sethi patent, the film cartridge comprises a generally flat lighttight plastic housing enclosing a rotatable disk of film provided with central hub that is accessible from the exterior of the housing. As also disclosed in the Sethi patent, the film disk is provided with a plurality of uniformly spaced exposure regions defined by previously exposing the surrounding portion of the film. The film cartridge is insertable into a cartridge chamber in which the front wall of the cartridge lies adjacent the rear surface of an intermediate camera wall, located rearwardly of the major components of the camera mechanism. More particularly, a camera in which the present invention is adapted to be emobidied is illustrated in commonly assigned, co-pending U.S. application Ser. No. 748,533.

Figure 3:
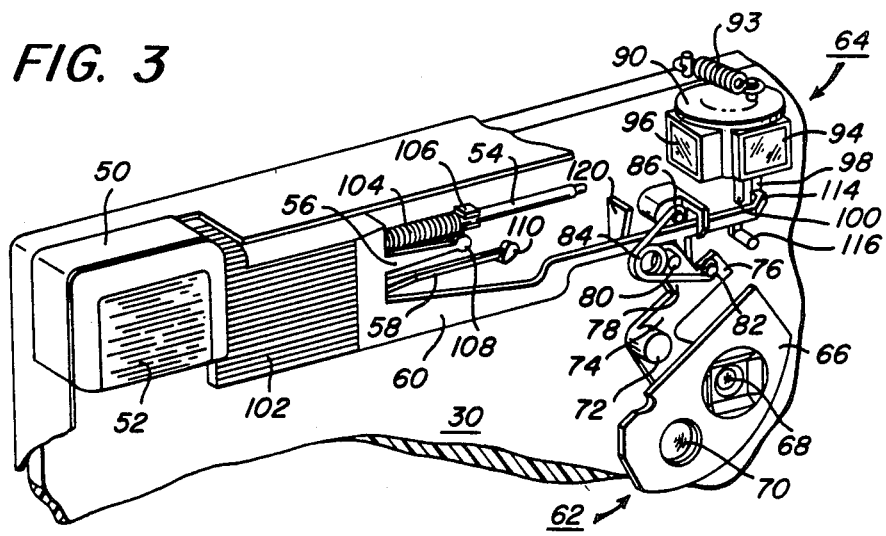
FIG. 3 is a perspective view of the flash, viewfinder, and objective lens, wherein the objective lens is focused at a relatively short distance.
Figure 4:
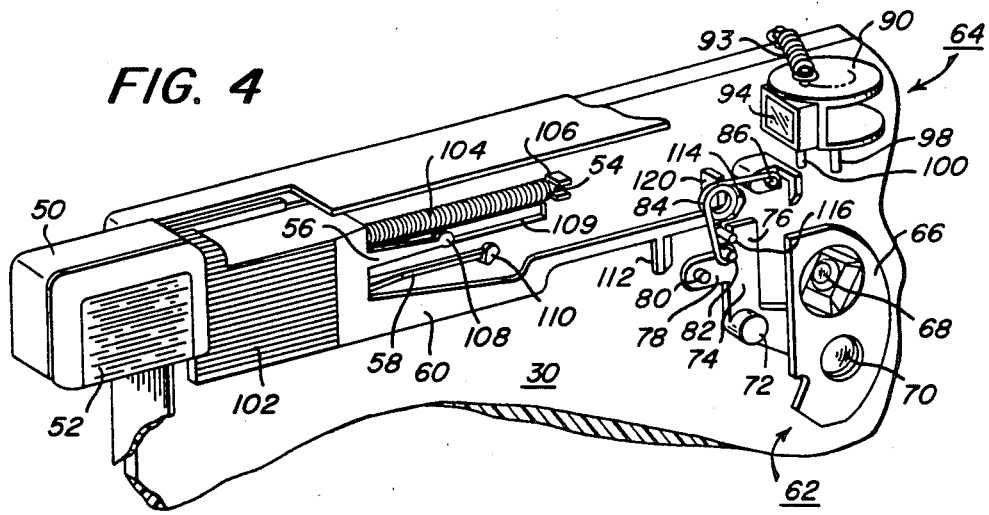
FIG. 4 is a perspective view of the flash, viewfinder, and objective lens wherein the objective lens is focused at a relatively remote distance.

As illustrated in FIGS. 3 and 4, a preferred embodiment of the present invention is illustrated and comprises a flash housing 50, containing a reflector and flashtube behind lens 52, as is well known in the art. The flash housing 50 is provided with a plurality of horizontally extending legs 54, 56, 58 and 60. In the illustrated embodiment, the flash housing 50 is mounted in the upper corner of the front of a small compact camera. The exposure aperture for exposing film and the associated lenses are disposed to the right and downward from the corner containing the flash. The flash housing 50 is arranged to be deployed outwardly from the end of the camera, to the left, as illustrated in FIG. 4, when the camera is arranged for exposing film with a lens having the longer of two focal lengths used. When the flash is retracted as illustrated inFIG. 3, the lens of the shorter focallength is employed. The components of the invention are mounted within the body of the camera and are generally disposed on the front surface of the intermediate wall 30 thereof. The camera is provided with an objective lens apparatus generally indicated at 62, and a viewfinder, generally indicated at 64. The objective lens apparatus comprises a turret 66 arranged to hold a normal lens 68 and a telephoto lens 70. The turret is mounted for rotation about an axis 72 so that the different lenses may be m oved into or out of exposure position under the control of the camera user. The turret is also provided with an arm 74 which is divided at its outer end into arm portions 76 and 78. Arm 78 carries an engagement pin 80 and a spring-mounting pin 82, provided for attachment of one end of an overcenter spring 84, the other end of which is attached to a pin 86 connected to the front surface of camera wall 30.

The viewfinder 64 comprises a rotatably mounted turret 90 arranged for horizontal rotation between a viewfinder window or aperture 91 in the back of the camera and the viewfinder window 14 in the front of the camera. An overcenter spring 93 is provided to assure proper location of the turret at each end of its rotation. Stops (not shown) may be provided for both turrets against which the turrets are urged by the overcenter springs to hold the respective lens sets in proper alignment for viewing and exposure.

The viewfinder turret 90 is provided with a first lens 94 which provides a normal or wide angle view throught the viewfinder for the camera user when positioned in the viewfinder optical path. The turret is also provided with a telephoto viewfinder lens 96, arranged to provide a narrow angle view through the viewfinder when aligned in the optical path of the viewfinder. Engagement pins 98 and 100 depend from the lower surface of the turret for engagement by the control means as will be described more thoroughly hereinbelow.

The horizontally extending legs 54–60 extend from a protective shell 102 connected to the right side (as viewed in FIGS. 3 and 4) of the flash housing 50 toward the viewfinder 64. The protective shell 102 is provided to fill the opening left in the camera housing by the flash housing as it is extended to prevent contact with any of the camera components therein by the camera user. The horizontal extending legs comprise a spring guide mandrel 54 around which spring 104 is disposed to urge the flash housing to its extended position. One end of the spring 104 bears against the end of protective shell 102 and the opposite end against an abutment 106 extending from the camera wall 20. This abutment 106 is arranged to retain the spring 104 and yet permit passage of spring andrel 54 when the flash housing is retracted, as illustrated in FIG. 3. Leg 56 is provided with a follower lug 108 at the end thereof which is arranged to follow a guide track 109 provided in the wall 30 of the camera. This guide leg assures the smooth linear motion of the flash housing during movement from the retracted to the extended positions.

Figure 5:
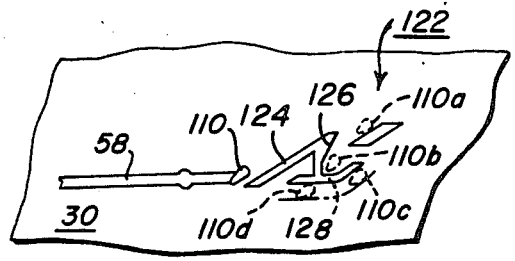
FIG. 5 is an enlarged detail of the detent cam and follower of the embodiment illustrated in FIGS. 3 and 4.

Leg 58 is provided with a flexible shaft and a cam follower end 110 which is arranged to follow a cam latch provided on the inner surface of the camera cover, not shown. Referring to FIG. 5, the cooperation between the cam follower 110 and the cam latch generally indicated at 122 is illustrated. The cam latch includes a ramped surface 124, a latch surface 126 and an exit deflector 128. The resilient leg 58 normally will hold the cam follower in the location indicated in FIG. 5 when the flash housing is extended. When the flash housing is retracted the leg 58, along with the cam follower 110, will move to the right in the illustration whereby the cam follower 110 will follow ramp surface 124, flexing leg 58 upwardly. When the flash housing is depressed by the user to a position slightly inboard of the camera housing, the cam follower will approach the position indicated in phantom at 110a. When the user removes pressure from the flash housing, the spring 104 will tend to return the flash housing to its extended position. However, because of the fact that leg 58 has been flexed by the cam following ramp surface 124, the leg will tend to pull the cam follower 110 down so that it will engage the latch surface 126 as indicated in phantom at 110b, thereby latching the flash housing in the retracted position, as illustrated in FIG. 3. When the user again depresses the flash housing inwardly, the cam follower will be deflected up over the end of exit deflector 128 and will be pulled downwardly again by the resilient leg 58 to follow the path around exit deflector 128 as indicated by phantom positions 110c and 110d to return to the initial position indicated with the flash housing extended.

The leg 60 extending from the flash housing forms the control means for effecting movement of both the lens apparatus and the viewfinder turrets under the influence of the position of the flash housing 50. The leg 60 is provided with first, second and third arm portions. An arm 112 depends from legs 60 and is arranged to engage pin 80 on arm 78 of the lens turret 66 and applies a rotational force counterclockwise to the turret when the flash housing is moved from the retracted to the extended position. Thus, as the arm 60 moves to the left in the figures, the turret is rotated so that the telephotolens 70 is disposed in front of the exposure aperture as illustrated in FIG. 4. An arm 114, at the end of leg 60, is arranged to engage pins 98 and 100, depending from the viewfinder turret. When the flash housing is moved to the extended position, leg 114 engages pin 100 to rotate the viewfinder turret clockwise about its axis to bring lens 96 into alignment with the viewfinder windows. When the viewfinder is fully extended, arm 114 engages a stop 120 which extends outwardly from the camera wall 30 to limit the extension of the flash housing 50. This condition is illustrated in FIG. 4, wherein the lens turret is rotated so that the telephoto lens 70, focused at a relatively remote distance, is disposed over the exposure aperture. The flash source is positioned at a distance from the lens apparatus greater than the retracted distance, and the viewfinder is adjusted to provide a relatively narrow angle view of a photographic scene, including a subject situated at a remote distance.

When the flash housing 50 is pushed into the retracted position, an arm 116 on leg 60 engages arm 76 of the lens turret 66 causing the turret to rotate clockwise. At the same time, arm 114 at the end of leg 60, engates pin 98 on the viewfinder turret 90 causing the turret to rotate counter clockwise. Motion in both directions to both the lens turret and the viewfinder turret is sufficient to move them beyond the center point of rotation whereby the overcenter springs 84 and 93 assure completion of the rotation of the respective turrets until the appropriate stops are reached, locating the desired lenses in proper position for satisfactory viewing and exposure. The condition imparted by leg 60 moving to the right is illustrated in FIG. 3 wherein the lens apparatus 62 has positioned a lens of normal focal length 68 over the exposure aperture which lens is focused at a relatively short distance. The viewfinder has been moved to provide a relatively wide angle view of the photographic scene through lens 94, and the flash source is positioned at the first distance fromthe lens apparatus less than the distance provided in the condition illustrated in FIG. 4.

ALTERNATIVE EMBODIMENT

Figure 8:
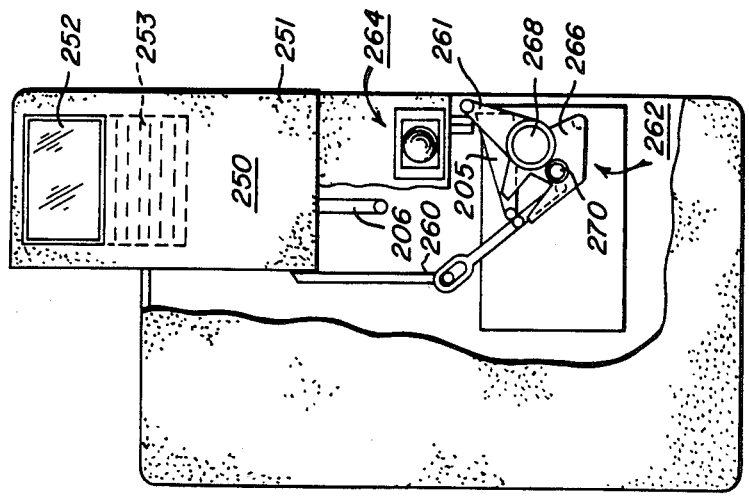
FIGS. 6-8 are schematic illustrations of an alternate embodiment in various operating positions.
Figure 6:
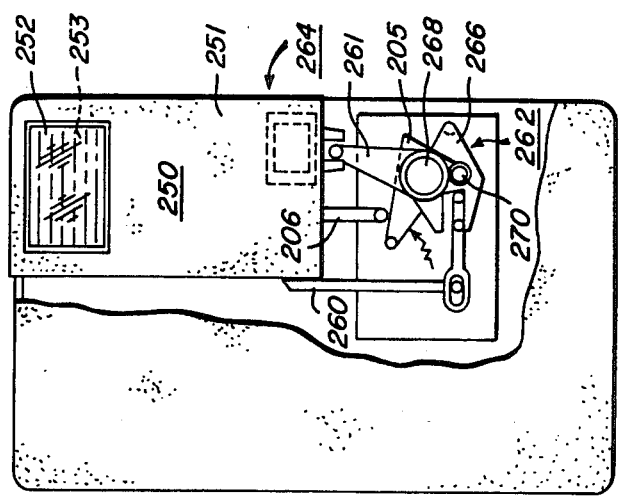

While the present invention has been described with respect to a preferred embodiment, it will be appreciated that variations and portions of the structure may be employed without departing from the concept of the invention. For example, referring to FIGS. 6–8, an alternative embodiment is illustrated employing the concept of the present invention with modifications and variations. With reference to these illustrations, similar parts of those described with respect to the preferred embodiment are provided with the same reference numerals except that the prefix 2 has been added to each of the components.

Figure 7:
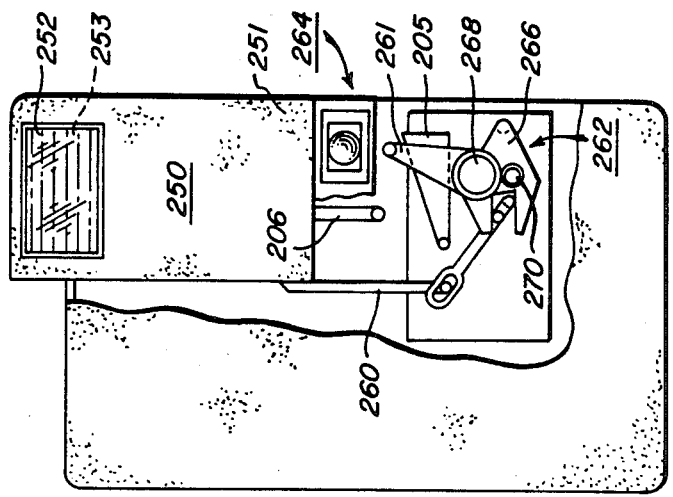

In this embodiment the lens apparatus is provided with a lens cover 205 which is arranged to cover the lens assembly 262 when the flash housing is in its retracted position. The flash housing 250 is also provided with a skirt portion 251 which arranged to cover the viewfinder 264 when the flash housing is retracted. When the flash housing is extended, in a manner similar to that with respect to the preferred embodiment, the skirt 251 of the flash housing 250 uncovers the viewfinder which is normally in the wide angle view condition consonant with the normal lens 268 in the exposure position. Arm 206, connected to the bottom of the flash housing, releases the lens cover 205 which is spring-driven to rotate away from covering the lens 268. At the same time, arm 260, also connected to the flash housing, rotates but does not change the objective lens turret 266. It will be noted that a spreading or diffusion lens 253 is disposed over the flash lens to diffuse the light provided for the normal lens exposure. This condition is illustrated in FIG. 7. In this embodiment the flash housing may be deployed to a second extended position, illustrated in FIG. 8, whereby the leg 260 has now rotated the lens turret 266 to move a telephoto lens 270 into alignment with the exposure aperture. At the same time, arm 261 which extends from the lens turret to the viewfinder turret, has moved the viewfinder to rotate the telephoto viewfinder lens into alignment with the viewfinder windows. In this condition the flash is separated even further from the objective lens to compensate for the telephoto exposure condition. Similarly, the viewfinder has been rotated to provide a telephoto view of the scene consonant with the scene that will be imaged by the objective telephoto lens.

It will thus be seen that the present apparatus provides means for providing a source of flash illumination wherein the distance between the flash source and the lens is varied depending on what lens is being utilized for exposure purposes. At the same time, the viewfinder is similarly controlled to provide an appropriate view consonant with the objective lens in use. Still further, the positioning of the flash source, with respect to the objective lens, is adjusted to increase the distance therebetween when a lens of longer focal length is employed to reduce the incidence of "red-eye" which might otherwise occur without the movement of the flash source. Still further, the present invention provides a simple, effective manual means for controlling all three of the foregoing elements with a simple, single movement by the camera user.

While the foregoing flash, lens and viewfinder construction have been described with respect to a disk film camera, the same and similar instructions can also be used for cameras employing other film types.

The invention has been described with reference to specific embodiments and variations, but it should be apparent that other modifications and variations can be made within the spirit and scope of the invention which is defined by the following claims.

We claim:

1. In a camera including means for providing a source of flash illumination having means adjustable for varying the illumination projected toward a photographic subject, a viewfinder adjustable to provide relatively wide-angle and relatively narrow-angle views of a scene, and lens apparatus movable for focusing said camera according to the distance between said camera and a subject to be photographed, the improvment comprising:

control means for controlling jointly said lens apparatus, said flash source, and said viewfinder, said control means having:

(1) a first condition in which
 (i) said lens apparatus is focused at a relatively short distance,
 (ii) said flash source is positioned at a first distance from the lens apparatus, and
 (iii) said viewfinder is adjusted to provide a relatively wide-angle view of a photographic scene including a photographic subject situated at such relatively short distance,
(2) a second condition in which
 (i) said lens apparatus is focused at a relatively remote distance,
 (ii) said flash source is positioned at a second distance from the lens apparatus greater than said first distance, and
 (iii) said viewfinder is adjusted to provide a relatively narrow-angle view of a photographic scene including a subject situated at the remote distance, and
(3) a third condition in which said lens apparatus, said viewfinder and said flash source are covered.

2. In a camera including means for providing a source of flash illumination having means adjustable for varying the illumination projected toward a photographic subject, a viewfinder adjustable to provide relatively wide-angle and relatively narrow-angle views of a scene, and lens apparatus movable for focusing said camera according to the distance between said camera and a subject to be photographed, the improvment comprising:

control means for controlling jointly said lens apparatus, said flash source, and said viewfinder, said control means having:

(1) a first condition in which
 (i) said lens apparatus is focused at a relatively short distance,
 (ii) said flash source is positioned at a first distance from the lens apparatus,
 (iii) said viewfinder is adjusted to provide relatively wide-angle view of a photographic scene including a photographic subject situated at such relatively short distance, and
(2) a second condition in which
 (i) said lens apparatus is focused at a relatively remote distance,
 (ii) said flash source is positioned at a second distance from the lens apparatus greater than said first distance, and
 (iii) said viewfinder is adjusted to provide a relatively narrow-angle view of a photographic scene including a subject situated at the remote distance, said viewfinder comprising a turret containing a relatively wide-angle lens and a relatively narrow-angle lens, a viewing aperture into said housing, means for disposing said relatively wide-angle lens set in alignment with said viewing aperture in said first condition and for disposing said relatively narrow angle lens set in alignment with said viewing aperture in said second condition, said lens apparatus comprising alens turret arranged for rotatable motion with respect to an exposure aperture, said lens turret containing a lens providing a relatively wide-angle image of a scene and a lens providing a relatively narrow-angle image of a scene, and an overcenter spring arranged to hold one or the other of said lenses in alignment with said exposure aperture, said flash source including a flash housing which is selectively positionable in a first position proximate to said lens apparatus and a second position distant from said lens apparatus, said flash housing having first means for engaging said viewfinder turret and second means for engaging said lens turret, and said control means including said flash housing whereby said turrets are disposed with the wide-angle lenses operatively positioned when said flash housing is disposed in its first position and said turrets are disposed with the narrow angle lenses operatively positioned when said flash housing is disposed in its second position.

3. The invention according to claim 2 wherein spring means is provided to urge said flash housing to said second position, and means for selectively holding said flash housing in said first position.

* * * * *